United States Patent
Peng et al.

(10) Patent No.: US 10,429,949 B2
(45) Date of Patent: Oct. 1, 2019

(54) USER INTERACTION APPARATUS AND METHOD

(71) Applicant: HTC CORPORATION, Taoyuan (TW)

(72) Inventors: Tzu-Yen Peng, Taoyuan (TW); Ssu-Po Chin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 160 days.

(21) Appl. No.: 15/640,418

(22) Filed: Jun. 30, 2017

(65) Prior Publication Data
US 2019/0004620 A1 Jan. 3, 2019

(51) Int. Cl.
| | |
|---|---|
| G06F 3/0346 | (2013.01) |
| G06F 3/038 | (2013.01) |
| A63F 13/211 | (2014.01) |
| G06F 3/01 | (2006.01) |
| G06F 1/16 | (2006.01) |
| G06F 3/0481 | (2013.01) |

(52) U.S. Cl.
CPC .......... *G06F 3/0346* (2013.01); *A63F 13/211* (2014.09); *G06F 1/163* (2013.01); *G06F 3/012* (2013.01); *G06F 3/017* (2013.01); *G06F 3/038* (2013.01); *G06F 3/04815* (2013.01)

(58) Field of Classification Search
CPC ........ G06F 3/017; G06F 3/011; G06F 3/0346; G06F 3/012; G06F 1/163; G06F 3/04815; G06F 3/01; G06T 19/006; G06T 7/70; G02B 27/017; G02B 27/0093; A63F 13/211; A63F 13/428; A63F 2300/105; A63F 2300/8082
See application file for complete search history.

(56) References Cited

U.S. PATENT DOCUMENTS

| | | | | |
|---|---|---|---|---|
| 7,352,359 B2* | 4/2008 | Zalewski | ................ | A63F 13/02 345/156 |
| 7,391,409 B2* | 6/2008 | Zalewski | ................ | G06F 3/017 345/156 |
| 7,636,645 B1* | 12/2009 | Yen | .......................... | A63F 13/02 702/152 |
| 8,384,665 B1* | 2/2013 | Powers, III | ............. | A63F 13/06 345/156 |
| 8,529,355 B2* | 9/2013 | Hiratake | ............... | G06F 3/0346 273/108.1 |

(Continued)

*Primary Examiner* — Michael J Jansen, II
(74) *Attorney, Agent, or Firm* — Masuvalley & Partners (57) ABSTRACT

The user interaction apparatus receives several movement values from a controller, calculates several applied force vectors according to the movement values, and determines that a specific applied force vector among the applied force vectors is greater than a threshold. Then, the user interaction apparatus determines that an angle between the specific applied force vector and an orientation vector is smaller than another threshold, receives a control position corresponding to the specific applied force vector from the controller, defines a boundary according to a calibrated position of a positioning apparatus or the orientation vector, and determines that the control position is outside the boundary. The user interaction apparatus controls a movement of a virtual object on a display after determining that the control position is outside the boundary.

16 Claims, 8 Drawing Sheets

(56) References Cited

U.S. PATENT DOCUMENTS

| | | | | |
|---|---|---|---|---|
| 8,678,282 B1* | 3/2014 | Black | | F41G 3/16 |
| | | | | 235/13 |
| 8,961,305 B2* | 2/2015 | Takeda | | A63F 13/02 |
| | | | | 463/31 |
| 9,007,399 B2* | 4/2015 | Tanaka | | G06T 19/006 |
| | | | | 345/633 |
| 9,152,248 B1* | 10/2015 | Powers, III | | A63F 13/06 |
| 9,211,475 B2* | 12/2015 | Miyamoto | | A63F 13/06 |
| 9,229,540 B2* | 1/2016 | Mandella | | G06F 3/03545 |
| 9,235,241 B2* | 1/2016 | Newham | | G06F 1/1694 |
| 9,247,212 B2* | 1/2016 | Bose | | H04N 7/18 |
| 9,261,968 B2* | 2/2016 | Yen | | A63F 13/06 |
| 9,405,372 B2* | 8/2016 | Yen | | A63F 13/06 |
| 9,474,968 B2* | 10/2016 | Zalewski | | A63F 13/02 |
| 9,551,873 B2* | 1/2017 | Zalewski | | G06F 3/01 |
| 9,606,363 B2* | 3/2017 | Zalewski | | G06F 3/01 |
| 9,613,147 B2* | 4/2017 | Carlson | | G08C 19/00 |
| 9,682,319 B2* | 6/2017 | Zalewski | | A63F 13/10 |
| 9,726,498 B2* | 8/2017 | Meduna | | G06F 1/3206 |
| 9,907,103 B2* | 2/2018 | Chen | | H04W 76/14 |
| 9,921,642 B2* | 3/2018 | Webb | | G06F 3/011 |
| 9,996,975 B2* | 6/2018 | Herman | | G06T 13/00 |
| 2006/0252475 A1* | 11/2006 | Zalewski | | A63F 13/02 |
| | | | | 463/1 |
| 2006/0252477 A1* | 11/2006 | Zalewski | | G06F 3/017 |
| | | | | 463/7 |
| 2006/0252541 A1* | 11/2006 | Zalewski | | A63F 13/02 |
| | | | | 463/36 |
| 2008/0009348 A1* | 1/2008 | Zalewski | | A63F 13/10 |
| | | | | 463/40 |
| 2008/0220867 A1* | 9/2008 | Zalewski | | G06F 3/017 |
| | | | | 463/37 |
| 2008/0242385 A1* | 10/2008 | Miyamoto | | A63F 13/06 |
| | | | | 463/1 |
| 2009/0096714 A1* | 4/2009 | Yamada | | G02B 27/017 |
| | | | | 345/8 |
| 2010/0001952 A1* | 1/2010 | Hiratake | | G06F 3/0346 |
| | | | | 345/158 |
| 2010/0113153 A1* | 5/2010 | Yen | | A63F 13/06 |
| | | | | 463/37 |
| 2011/0190052 A1* | 8/2011 | Takeda | | A63F 13/02 |
| | | | | 463/31 |
| 2012/0038549 A1* | 2/2012 | Mandella | | G06F 3/011 |
| | | | | 345/156 |
| 2012/0050281 A1* | 3/2012 | Tanaka | | G06T 19/006 |
| | | | | 345/419 |
| 2013/0128022 A1* | 5/2013 | Bose | | H04N 7/18 |
| | | | | 348/77 |
| 2013/0303247 A1* | 11/2013 | Wu | | A63F 13/005 |
| | | | | 463/5 |
| 2014/0092009 A1* | 4/2014 | Yen | | A63F 13/06 |
| | | | | 345/156 |
| 2015/0022444 A1* | 1/2015 | Ooi | | G06F 3/011 |
| | | | | 345/156 |
| 2015/0269780 A1* | 9/2015 | Herman | | G06T 13/00 |
| | | | | 345/633 |
| 2015/0348327 A1* | 12/2015 | Zalewski | | G06F 3/01 |
| | | | | 345/419 |
| 2016/0048994 A1* | 2/2016 | Powers, III | | A63F 13/06 |
| | | | | 345/474 |
| 2016/0098095 A1* | 4/2016 | Gonzalez-Banos | | G06F 3/017 |
| | | | | 345/156 |
| 2016/0105923 A1* | 4/2016 | Chen | | H04W 76/14 |
| | | | | 455/41.2 |
| 2016/0209658 A1* | 7/2016 | Zalewski | | G06F 3/01 |
| 2016/0364013 A1* | 12/2016 | Katz | | G06F 3/0304 |
| 2016/0378204 A1* | 12/2016 | Chen | | G01C 3/08 |
| | | | | 345/156 |
| 2017/0123487 A1* | 5/2017 | Hazra | | G06F 3/015 |
| 2017/0243324 A1* | 8/2017 | Mierle | | G06F 3/012 |
| 2017/0244811 A1* | 8/2017 | Mckenzie | | H04W 76/14 |
| 2017/0262048 A1* | 9/2017 | Webb | | G06F 3/011 |
| 2017/0351094 A1* | 12/2017 | Poulos | | G01B 7/003 |
| 2017/0357332 A1* | 12/2017 | Balan | | G02B 27/0093 |
| 2017/0357333 A1* | 12/2017 | Balan | | H04N 13/204 |
| 2017/0357334 A1* | 12/2017 | Balan | | H04N 13/204 |
| 2017/0358139 A1* | 12/2017 | Balan | | G02B 27/0172 |
| 2018/0024623 A1* | 1/2018 | Faaborg | | G06F 3/011 |
| | | | | 345/156 |
| 2018/0039341 A1* | 2/2018 | Du Bois | | G06F 3/012 |
| 2018/0059777 A1* | 3/2018 | Kobayashi | | G06F 3/011 |
| 2018/0101986 A1* | 4/2018 | Burns | | G06T 19/006 |
| 2018/0107835 A1* | 4/2018 | Clement | | G06F 3/011 |
| 2018/0107839 A1* | 4/2018 | Clement | | G06F 21/6245 |
| 2018/0284882 A1* | 10/2018 | Shipes | | G06F 3/011 |
| 2019/0004620 A1* | 1/2019 | Peng | | G06F 3/0346 |
| 2019/0018489 A1* | 1/2019 | Pan | | G06F 3/016 |

\* cited by examiner

USER INTERACTION APPARATUS AND METHOD

CROSS-REFERENCES TO RELATED APPLICATIONS

Not applicable.

BACKGROUND OF THE INVENTION

Field of the Invention

The present invention relates to a user interaction apparatus and method. More particularly, the present invention relates to a user interaction apparatus and method that control a virtual object on a display.

Descriptions of the Related Art

User interaction systems that provide users with user interaction environments (e.g. user interaction games, user interaction learning materials) have been on the market for several years. With the development of virtual reality and augmented reality, more types of user interaction systems have been evolved.

In the user interaction environments provided by some of the user interaction systems, a user may control a virtual object (e.g. a virtual ball) shown on a display by a specially-designed controller. To be more specific, when the virtual object is under the control of the specially-designed controller (e.g. the virtual object has been engaged with a virtual hand of the user), the user may move the controller in the real world to control the movement of the virtual object. When the user wants to release the virtual object from the virtual hand at a certain time instant (e.g. when the user is mimicking pitching), he/she has to press a button on the specially-designed controller so that the display will show the virtual object being thrown out. However, when the user throws a real object (e.g. pitches) in the real world, all he/she has to do is throwing the object. Comparing to throwing a real object in the real world, "pressing a button" is an extra action. Consequently, user interaction apparatus and methods that can provide users with immersive experience that is more similar to the real world are still needed.

SUMMARY OF THE INVENTION

An objective of the present invention is to provide a user interaction apparatus, which comprises an interface and a processor electrically connected to the interface. In one embodiment, the interface is configured to receive a plurality of movement values from a controller. The processor is configured to calculate a plurality of applied force vectors according to the movement values. The processor further determines that a specific applied force vector among the applied force vectors is greater than a first threshold and determines that an angle between the specific applied force vector and an orientation vector is smaller than a second threshold. The interface further receives a control position corresponding to the specific applied force vector from the controller. The processor further defines a boundary according to one of a calibrated position of a positioning apparatus and the orientation vector, determines that the control position is outside the boundary, and controls a movement of a virtual object on a display after determining that the control position is outside the boundary.

Another objective of the present invention is to provide a user interaction method for use in an electronic computing apparatus. The electronic computing apparatus is electrically connected to a positioning apparatus and a controller. In one embodiment, the user interaction method comprises the following steps of: (a) receiving a plurality of movement values from a controller, (b) calculating a plurality of applied force vectors according to the movement values, (c) determining that a specific applied force vector among the applied force vectors is greater than a first threshold, (d) determining that an angle between the specific applied force vector and an orientation vector is smaller than a second threshold, (e) receiving a control position corresponding to the specific applied force vector from the controller, (0 defining a boundary according to one of a calibrated position of the positioning apparatus and the orientation vector, (g) determining that the control position is outside the boundary, and (h) controlling a movement of a virtual object on a display after the step (g).

In one embodiment, the user interaction apparatus and method of the present invention control a virtual object on a display by three parts, including (i) determining whether two applied force conditions are met (i.e. determining whether a specific applied force vector among the applied force vectors is greater than a first threshold and determining whether an angle between the specific applied force vector and an orientation vector is smaller than a second threshold), (ii) determining whether the virtual object is considered as released (i.e. determining whether a control position corresponding to the specific applied force vector is outside the boundary), and (iii) controlling a movement of the virtual object on the display after determining that the virtual object is released. With the three main parts of the operations, the user can control the virtual object on the display like the way in the real world (i.e. without pressing any specifically-designed button). Therefore, the user interaction apparatus and method of the present invention provide users with immersive experience that is more similar to the real world.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the user interaction apparatus and method provided in the present invention will be explained with reference to embodiments thereof. However, these embodiments are not intended to limit the present invention to any environment, applications, or implementations described in these embodiments. Therefore, description of these embodiments is only for purpose of illustration rather than to limit the present invention. It shall be appreciated that elements unrelated to the present invention are omitted from depiction in the following embodiments and the attached drawings. In addition, dimensions of elements and dimensional relationships among individual elements in the attached drawings are only for the purpose of illustration, but not to limit the scope of the present invention.

Figure 1A:
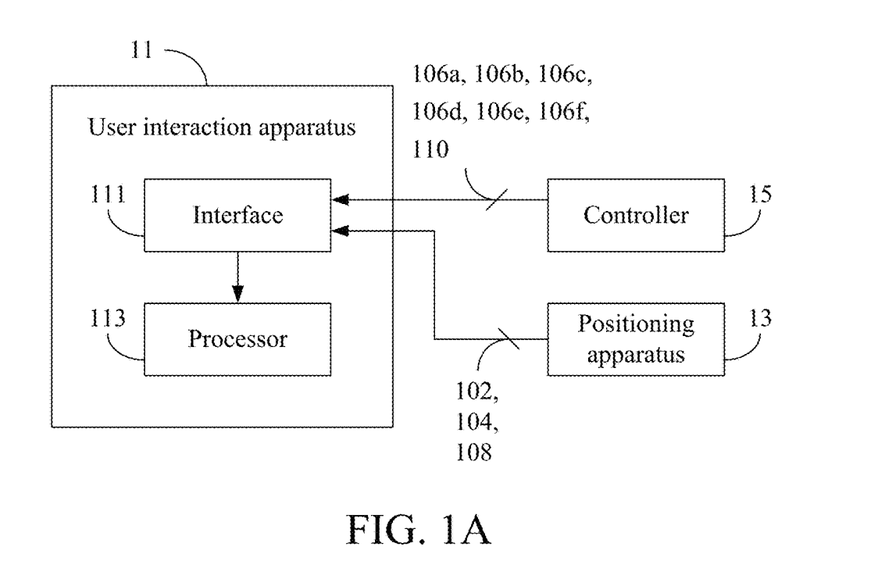
FIG. 1A illustrates the user interaction system 1 of the first embodiment.

A first embodiment of the present invention is a user interaction system 1 and a schematic view of which is illustrated in FIG. 1A. The user interaction system 1 comprises a user interaction apparatus 11, a positioning apparatus 13, and a controller 15. The user interaction system 1 provides a user 10 with a user interaction environment (e.g. a user interaction game, a user interaction learning material) when it is activated. The user 10 involved in the user interaction environment carries the positioning apparatus 13 and the controller 15 for interaction. Generally speaking, the positioning apparatus 13 provides the user interaction apparatus 11 with information related to the position of the user 10. In some embodiments, the positioning apparatus 13 may be integrated into a helmet (or other wearable device) or implemented as a helmet (or other wearable device) so that the user 10 can wear it on. In addition, the user 10 may utilize the controller 15 to control a virtual object (e.g. a virtual ball) shown on a display (e.g. swing the controller 15). The display may be included in the user interaction apparatus 11, included in the positioning apparatus 13, or external to both the user interaction apparatus 11 and the positioning apparatus 13.

The user interaction apparatus 11 comprises an interface 111 and a processor 113, wherein the interface 111 is electrically connected to the processor 113. The interface 111 may be a Bluetooth interface, an Infrared (IF) interface, or any other wireless or wired interfaces that is capable of transceiving signal and/or data with other apparatuses. The processor 113 may be any of central processing units (CPUs), microprocessors, or other computing devices known to those of ordinary skill in the art.

Figure 1B:
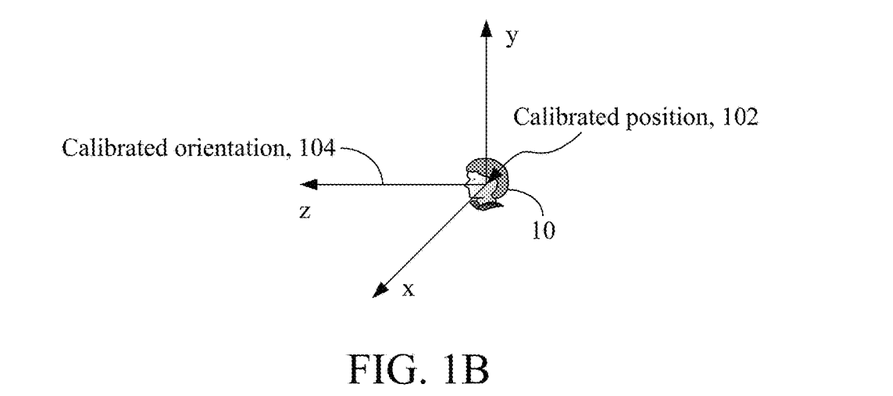
FIG. 1B illustrates the calibrated position 102 and the calibrated orientation vector representing the calibrated orientation 104 when a three-dimensional coordinate system is adopted.

In this embodiment, a calibration procedure is executed after the activation of the user interaction system 1. During the calibration procedure, the user 10 stands still and carries the positioning apparatus 13 and the control apparatus 15 (e.g. wears the positioning apparatus 13 on his/her head and holds the control apparatus 15 in hand). The interface 111 receives a calibrated position 102 and a calibrated orientation 104 of the positioning apparatus 13 from the positioning apparatus 13. Since the positioning apparatus 13 is carried by the user 10, the calibrated position 102 may be deemed as the position of the user 10 and the calibrated orientation 104 may be deemed as the direction that the user 10 is facing. In some embodiments, a three-dimensional coordinate system may be adopted for representing the space that contains the user interaction system 1 and an example of which is shown in FIG. 1B. In the example shown in FIG. 1B, the calibrated position 102 is denoted as (0, 0, 0) and a calibrated orientation vector representing the calibrated orientation 104 is denoted as (0, 0, 1). During the calibration procedure, the user interaction apparatus 11 may further derive body information of the user 10, such as height, length of two outstretched arms, etc. Please note that the body information may be directly inputted by the user 10, detected by a video camera (if there is one), or measured by other mechanism. It is noted that the present invention does not limit the way that the user interaction apparatus 11 derives the body information.

In some embodiments, the user interaction apparatus 11 may already have the calibrated position 102, the calibrated orientation 104, the calibrated orientation vector, and the body information. For those embodiments, the calibration procedure may be omitted. The aforementioned the calibrated position 102, the calibrated orientation 104, the calibrated orientation vector, and/or the body information may be stored in a storage unit (not shown) within the user interaction apparatus 11 or in a storage unit external to the user interaction apparatus 11.

After the calibration procedure, the user 10 may begin to enjoy the user interaction environment (e.g. a user interaction game, a user interaction learning material) provided by the user interaction system 1. During the interaction procedure, the user 10 utilizes the controller 15 to control a virtual object (e.g. a virtual ball) shown on the display (e.g. throwing the controller 15 without releasing the controller 15 from the hand). In the following description, it is assumed that the virtual object is under the control of the controller 15 (e.g. the virtual object has been engaged with the virtual hand of the user 10). The control of the virtual object may be divided into three parts, including (i) determining whether two applied force conditions are met, (ii) determining whether the virtual object is considered as released, and (iii) controlling a movement of the virtual object on the display after determining that the virtual object is released. Each of the three parts will be elaborated below.

Herein, the details of the first part (i.e. determining whether two applied force conditions are met) are given. In the first part, two applied force conditions are examined. Generally speaking, the first applied force condition determines whether the applied force of the user 10 is great enough, while the second applied force condition determines whether the direction of the applied force is roughly consistent with the direction that the user 10 faces.

When the controller 15 is moved, the controller 15 generates a plurality of movement values indicating the degree of the movement. In some embodiments, the controller 15 may comprise a G-sensor to achieve that and the movement values in those embodiments are acceleration values. For convenience, in the following description, it is assumed that the controller 15 generates a plurality of movement values 106a, 106b, 106c, 106d, 106e, 106f within a time interval when the user 10 moves the controller 15. Please note that the present invention does not limit the number of the movement values generated by the controller 15 to six. The movement values 106a, 106b, 106c, 106d, 106e, 106f have a temporal sequence; that is, the movement value 106a is generated before the movement value 106b, the movement value 106b is generated before the movement value 106c, and so on. The interface 111 of the user interaction apparatus 11 receives the movement values 106a, 106b, 106c, 106d, 106e, 106f from the controller 15.

The processor 113 of the user interaction apparatus 11 calculates a plurality of applied force vectors according to the movement values 106a, 106b, 106c, 106d, 106e, 106f For example, the processor 113 of the user interaction apparatus 11 may calculate a plurality of applied force vectors by applying a subtraction operation to all the two consecutive movement values. That is, the processor 113 calculates a first applied force vector by subtracting the movement value 106a from the movement value 106b, a second applied force vector by subtracting the movement value 106b from the movement value 106c, a third applied force vector by subtracting the movement value 106c from the movement value 106d, a fourth applied force vector by subtracting the movement value 106d from the movement value 106e, and a fifth applied force vector by subtracting the movement value 106e from the movement value 106f.

Next, the processor 113 determines whether any of the aforementioned applied force vectors is greater than a first threshold. If at least one of the aforementioned applied force vectors is greater than the first threshold, the first applied force condition is met. Please note that if only one of the aforementioned applied force vectors is greater than the first threshold, the applied force vector that is greater than the first threshold is referred to as "a specific applied force vector." If more than one of the applied force vectors are greater than the first threshold, any applied force vector that is greater than the first threshold can be referred to as "a specific applied force vector." For convenience, it is assumed that the processor 113 determines that the fifth applied force vector is greater than the first threshold. The interface 111 receives an orientation vector 108 corresponding to the specific applied force vector from the positioning apparatus 13. An orientation vector is considered as corresponding to the specific applied force vector if it is generated by the positioning apparatus 13 at a time instant that is the same as or close to the time instant when any of the two movement values involved in the specific applied force vector was generated. Since the calculation of the specific applied force vector (i.e. the fifth applied force vector) involves the movement values 106e, 106f, the orientation vector that is generated at a time instant that is the same as or close to the time instant when the movement value 106e or the movement value 106f is generated is the orientation vector 108 corresponding to the specific applied force vector.

Since the positioning apparatus 13 is carried by the user and the orientation vector 108 is generated at the time instant that is the same as or close to the time instant when the movement value 106e or the movement value 106f is generated, the orientation vector 108 may be deemed as the orientation that the user is facing when the movement value 106e or the movement value 106f is generated. Then, the processor 113 determines whether an angle between the specific applied force vector (i.e. the fifth applied force vector) and the orientation vector 108 is smaller than a second threshold. It means that the processor 113 determines whether an orientation of the specific applied force vector is roughly consistent with the orientation vector 108. In other words, the processor 113 determines whether the orientation of the specific applied force is roughly consistent with the orientation that the user faces (i.e. whether the second applied force condition is met). If the angle between the specific applied force vector and the orientation vector 108 is smaller than the second threshold, it is considered that the orientation of the specific applied force vector is roughly consistent with the orientation vector 108 (i.e. the second applied force condition is met).

In some embodiments, the processor 113 may determine whether the angle between the specific applied force vector and the orientation vector 108 is smaller than the second threshold by determining whether a multiplied value of a component of the specific applied force vector and a component of the orientation vector 108 is greater than a third threshold. When the multiplied value of the component of the specific applied force vector and the component of the orientation vector 108 is greater than the third threshold, the angle between the specific applied force vector and the orientation vector 108 is smaller than the second threshold.

It is noted that the aforementioned component of the specific applied force vector and the aforementioned component of the orientation vector 108 correspond to the same orientation. To be more specific, both the aforementioned component of the specific applied force vector and the aforementioned component of the orientation vector 108 correspond to the calibrated orientation 104. If the three-dimensional coordinate system illustrated in FIG. 1B is adopted, both the aforementioned component of the specific applied force vector and the aforementioned component of the orientation vector 108 correspond to the z-orientation. For convenience, it is assumed that the angle between the specific applied force vector and the orientation vector 108 is smaller than the second threshold in the following description.

In this embodiment, the user interaction apparatus 11 will proceed to the second part (i.e. determining whether the virtual object is considered as released) only if the aforementioned two applied force conditions are met. Herein, the details of the second part are given.

The interface 111 receives a control position 110 (i.e. a position of the controller 15) corresponding to the specific applied force vector from the controller 15. A control position is considered as corresponding to the specific applied force vector if it is generated by the controller 15 at a time instant that is the same as or close to the time instant when any of the two movement values involved in the specific applied force vector was generated. Since the calculation of the specific applied force vector (i.e. the fifth applied force vector) involves the movement values 106e, 106f, the control position that is generated at a time instant that is the same as or close to the time instant when the movement value 106e or the movement value 106f is generated is the control position 110 corresponding to the specific applied force vector. Since the controller 15 is carried by the user and the control position 110 is generated at the time instant that is the same as or close to the time instant when the movement value 106e or the movement value 106f is generated, the control position 110 may be deemed as the position of the controller 15 when the movement value 106e or the movement value 106f is generated. In addition, the control position 110 may be considered as the position of the controller 15 when the applied force of the user 10 is great enough. That is, the control position 110 may be considered as the released position of the virtual object.

The processor 113 defines a boundary according to the calibrated position 102 of the positioning apparatus 13 or the orientation vector 108 and then determines whether the control position 110 is outside the boundary.

Figure 1C:
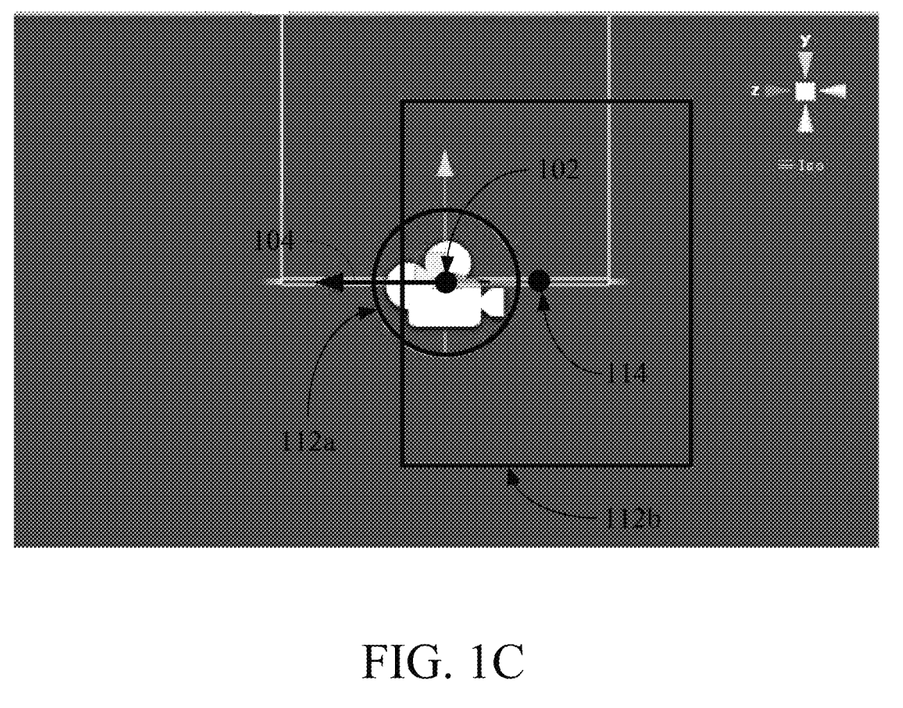
FIG. 1C illustrates the side view of the first kind of boundary.
Figure 1D:
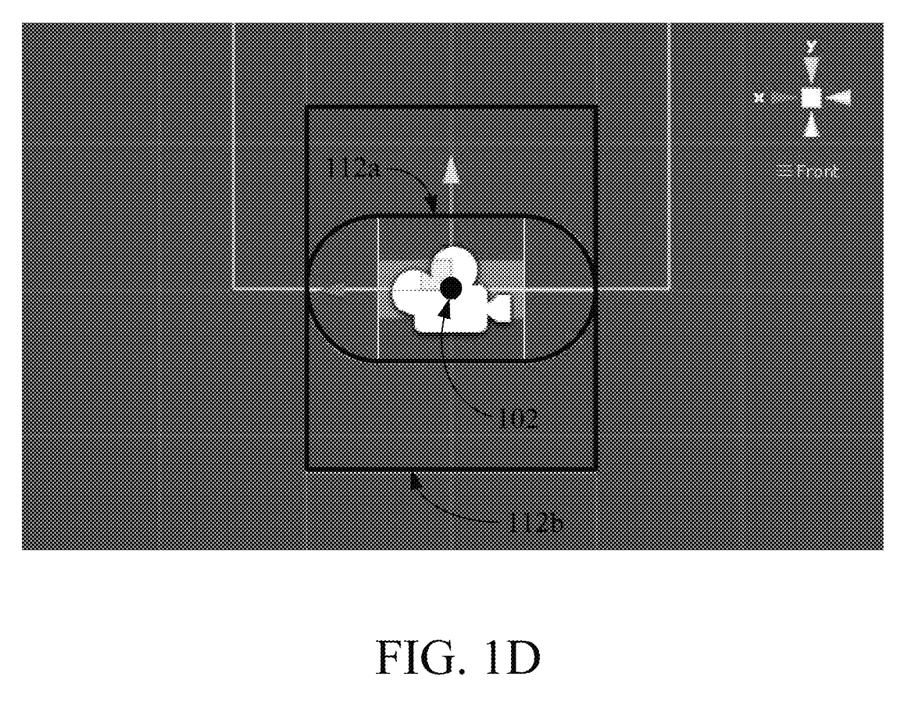
FIG. 1D illustrates the front view of the first kind of boundary.
Figure 1E:
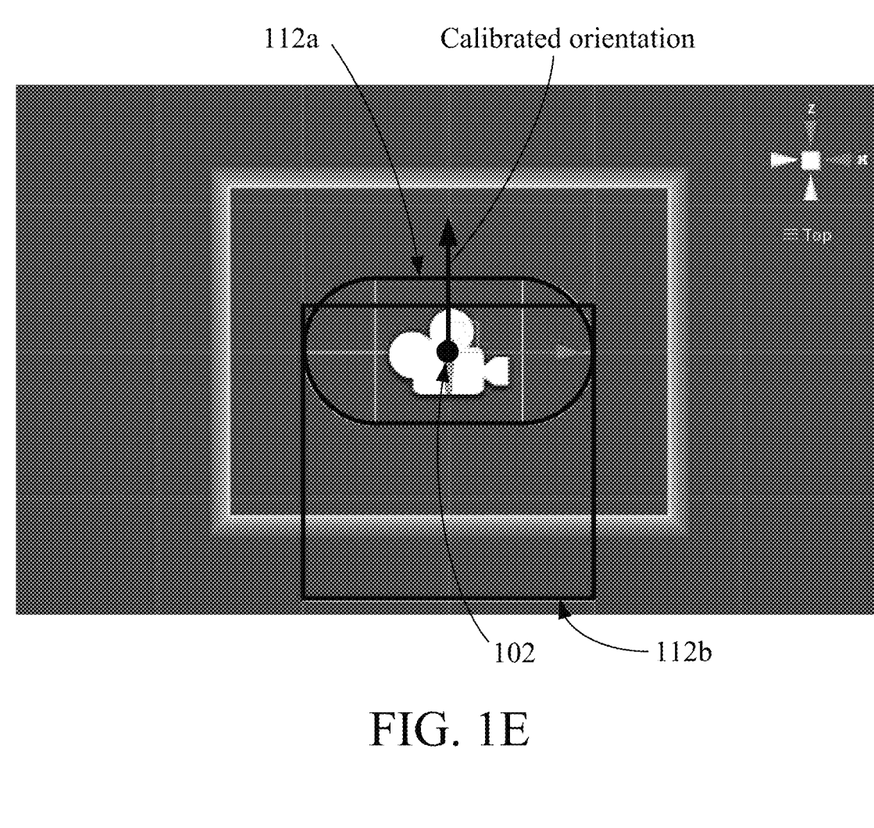
FIG. 1E illustrates the top view of the first kind of boundary.

Please refer to FIG. 1C, FIG. 1D, and FIG. 1E, which respectively illustrate the side view, front view, and top view of the first kind of boundary. In FIG. 1C, FIG. 1D, and FIG. 1E, the white portion represents the upper body of the user 10. The first kind of boundary is defined according to the calibrated position 102. Specifically, the processor 113 defines the boundary according to the calibrated position 102 by defining a first volume 112a centered at the calibrated position 102 and defining a second volume 112b centered at a position 114 within a first predetermined distance of the calibrated position 102. Comparing to the calibrated position 102, the position 114 may be at the opposition orientation of the calibrated orientation 104. The first volume 112a and the second volume 112b overlap and a surface of the first volume 112a and the second volume 112b forms the boundary. In some embodiments, the first volume 112a is a capsule and the second volume 112b is a cuboid.

A concrete example is given herein for better understanding. In this example, the first volume 112a is a capsule and the second volume 112b is a cuboid. The length of the capsule may be determined according to the length of the two outstretched arms (e.g. 1.17 times the length of the two outstretched arms) and the radius of the capsule may be a quarter of the length of the capsule. The length and the width of the cuboid may be determined according to the length of the two outstretched arms (e.g. 1.2 times the length of the two outstretched arms), while the height of the cuboid may be determined according to the height of the user (e.g. 1.5 times the height of the user). The center of the cuboid may be at the (0, 0, −1) direction and the first predetermined distance between the calibrated position 102 and the center of the cuboid may be determined according to the length of the two outstretched arms (e.g. 0.4 times the length of the two outstretched arms).

Figure 1F:
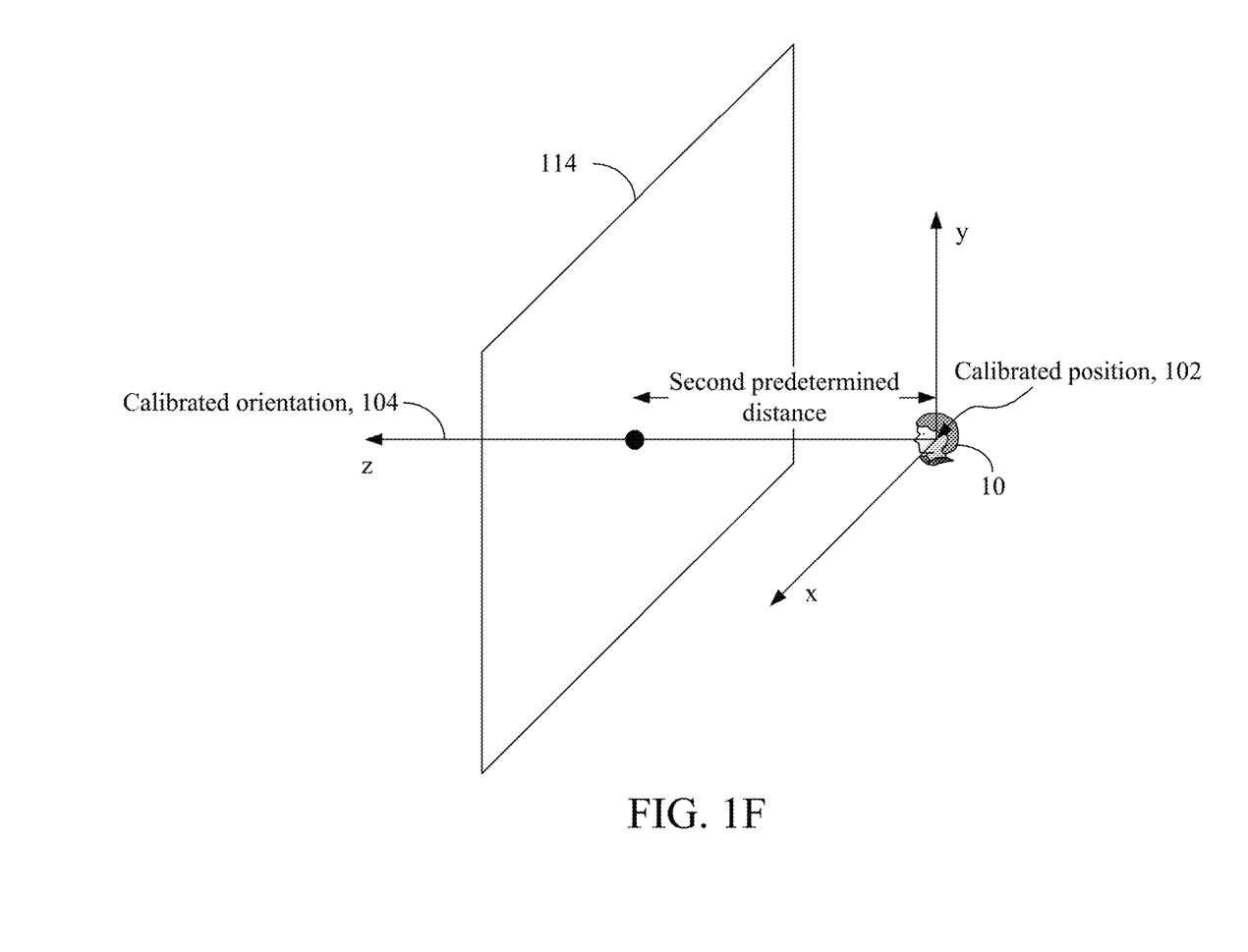
FIG. 1F illustrates the second kind of boundary.

The second kind of boundary is described herein. There are occasions that an angle between the orientation vector 108 corresponding to the specific applied force vector and the calibrated orientation vector representing the calibrated orientation 104 may be greater than a fourth threshold (e.g. 25 degrees). It usually happens to the user 10 who has the tendency of turning his/her head when throwing an object. If the processor 113 determines that the angle between the orientation vector 108 and the calibrated orientation vector is greater than the fourth threshold, the processor 113 defines a plane 114 perpendicular to the calibrated orientation vector and at a second predetermined distance (e.g. 0.12 times the length of the two outstretched arms) to the calibrated position 102 as shown in FIG. 1F. It is noted that the plane 114 is the boundary. The space that contains the user interaction system 1 is divided into two portions by the plane 114, wherein the portion that is farther to the user 10 is considered as the outside of the boundary.

In this embodiment, the user interaction apparatus 11 will proceed to the third part (i.e. controlling a movement of the virtual object on the display after determining that the virtual object is released) if the processor 113 determines that the control position 110 is outside the boundary. The details of the third part are given below.

In the third part, the processor 113 defines a plurality of areas according to the calibrated position 102, a first plane, and a second plane, wherein the first plane and the second plane intersect. In other words, the processor 113 divides the space that contains the user interaction system 1 into four areas according to the calibrated position 102, the first plane, and the second plane. Please refer to FIG. 1G for a concrete example, which illustrates the third part from the back view of the user 10. In this concrete example, the user 10 wears the positioning apparatus 13 on his/her head 100 and, hence, the calibrated position 102 represents the head position of the user 10. Both the first plane 116a and the second plane 116b are tilted planes, wherein the angle between the first plane 116a and the x-direction is positive (e.g. 30 degrees) and the angle between the second plane 116b and the x-direction is negative (e.g. −30 degrees). The processor 113 defines an overhand area 118a, a lower hand area 118b, a side-arm left area 118c, and a side-arm right area 118d according to the calibrated position 102, the first plane 116a, and the second plane 116b, wherein the first plane 116a and the second plane 116b intersect at a position 120 that is at a third predetermined distance (e.g. 0.3 meters) below the calibrated position 102. The broken line 122 may be considered at the same height of the shoulder of the user 10.

Figure 1G:
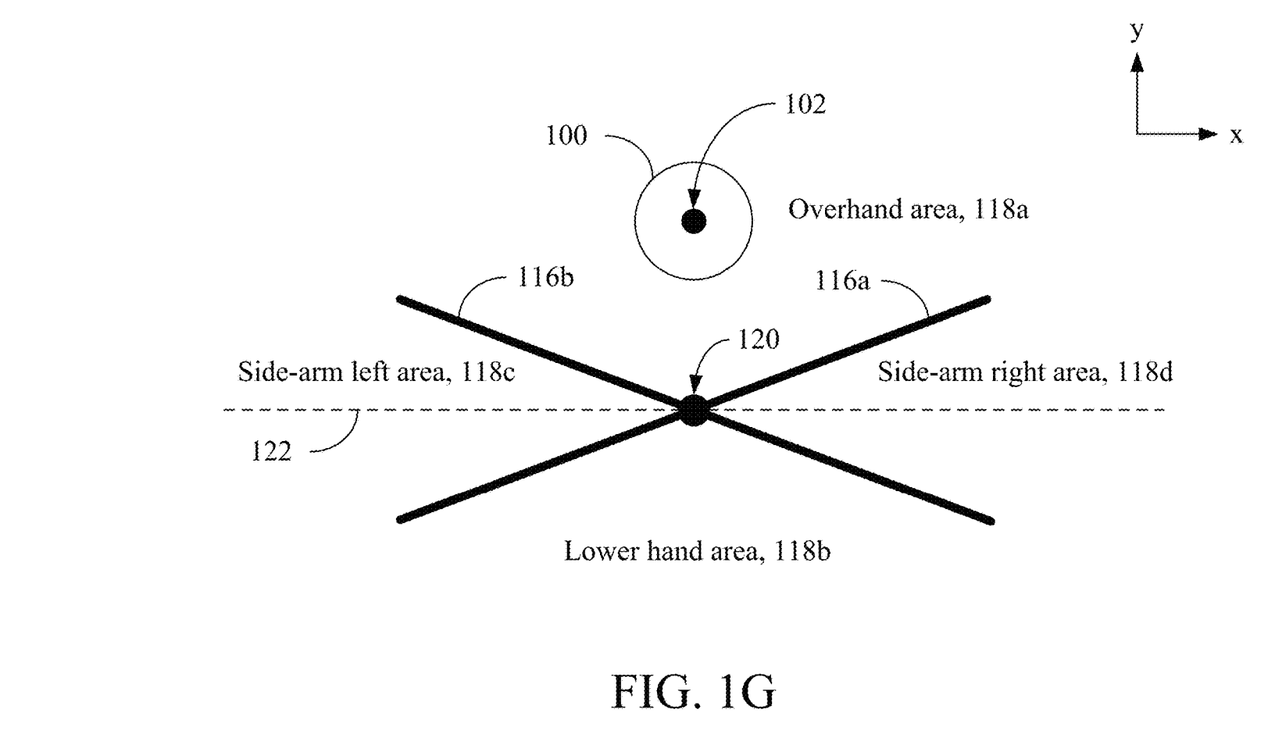
FIG. 1G illustrates the areas defined by the user interaction apparatus 11 from the back view of the user 10; and FIG. 2A

The processor 113 further determines that the control position 110 is within one of the areas. For convenience, the area that the control position 110 is located is referred to as "a specific area." The specific area is deemed as the released area of the virtual object. In some embodiments, the processor 113 may further decide a movement path according to the specific area. For example, if the user interaction environment provided by the user interaction system 1 is a baseball game, the processor 113 may respectively assign a fastball movement path, a sinker ball movement path, a cutter movement path, and a split-finger fastball movement path respectively to the overhand area 118a, the lower hand area 118b, the side-arm left area 118c, and the side-arm right area 118d and decide the movement path once the specific area is decided.

Then, the processor 113 calculates an output vector for the virtual object on the display according to the specific area and the specific applied force vector. The output vector is considered as the direction of the virtual object.

Please refer to FIG. 1G for a concrete example. As shown in FIG. 1G, four areas including the overhand area 118a, the lower hand area 118b, the side-arm left area 118c, and the side-arm right area 118d are defined by the processor 113. The processor 113 calculates the output vector in one way when the specific area is any one of the lower hand area 118b, the side-arm left area 118c, and the side-arm right area 118d and calculates the output vector in another way when the specific area is the overhand area 118a.

Now, the situation that the specific area is any one of the lower hand area 118b, the side-arm left area 118c, and the side-arm right area 118d is described. In this situation, the processor 113 calculates the output vector by averaging a subset of the aforementioned applied force vectors, wherein the subset includes the specific applied force vector. In some embodiments, the processor 113 may select the specific applied force vector and a number of the applied force vectors that occur right before the specific applied force vector as the subset and then calculates the output vector by averaging the applied force vectors in the subset. For example, the processor 113 may select the fifth applied force vector (i.e. the specific applied force vector) and the first, second, third, and fourth applied force vectors (i.e. four applied force vectors that occur right before the specific applied force vector) and average them to be the output vector.

Now, the situation that the specific area is the overhand area 118a is described. In this situation, the processor 113 calculates a first vector by averaging a subset of the aforementioned applied force vectors, wherein the subset includes the specific applied force vector. For example, the processor 113 may select the specific applied force vector and a number of the applied force vectors that occur right before the specific applied force vector as the subset and then averages the applied force vectors in the subset as the first vector. The processor 113 further calculates a second vector by averaging the specific applied force vector and the applied force vector right before the specific applied force vector. In addition, the processor 113 calculates a third vector by averaging the first vector and the second vector. A concrete example is given herein for better understanding. The processor 113 may select the fifth applied force vector (i.e. the specific applied force vector) and the first, second, third, and fourth applied force vectors (i.e. four applied force vectors that occur right before the specific applied force vector) and average them to be the first vector. In addition, the processor 113 calculates a second vector by averaging the fifth applied force vector (i.e. the specific applied force vector) and the fourth applied force vector (i.e. the applied force vector right before the specific applied force vector) and calculates a third vector by averaging the first vector and the second vector.

Then, the processor 113 calculates an angle between each of the first vector, the second vector, and the third vector and each of a calibrated orientation vector and an opposite orientation vector of the calibrated orientation vector. For example, if the three-dimensional coordinate system shown in FIG. 1B is adopted, the calibrated orientation vector may be represented as (0, 0, 1) and the opposite orientation vector of the calibrated orientation vector may be represented as (0, 0, −1). Afterwards, the processor 113 decides the output vector to be the vector (among the first vector, the second vector, and the third vector) corresponding to the smallest angle.

In some embodiments, the processor 113 may further apply a weight to the output vector. When a greater weight is applied, the virtual object will be moved faster. On the contrary, when a smaller weight is applied, the virtual object will be moved slower. In some embodiments, the value of the weight may be decided based on the identity of the user. Afterwards, the user interaction apparatus 11 can control the movement of the virtual object shown on the display according to the control position 110, the movement path, and the output vector.

According to the above description, the user interaction apparatus 11 controls the virtual object on the display by four parts, including (i) determining whether two applied force conditions are met, (ii) determining whether the virtual object is considered as released, and (iii) controlling a movement of the virtual object on the display after determining that the virtual object is released. With the operations performed by the user interaction apparatus 11, the user 10 can control the virtual object on the display like the way in the real world. That is, when the user 10 wants to release the virtual object from the virtual hand at a certain time instant (e.g. when the user is mimicking pitching), all he/she has to do is pretending throwing the controller 15 without pressing any button. Therefore, the user interaction system 1 can provide users with immersive experience that is more similar to the real world.

Figure 2A:
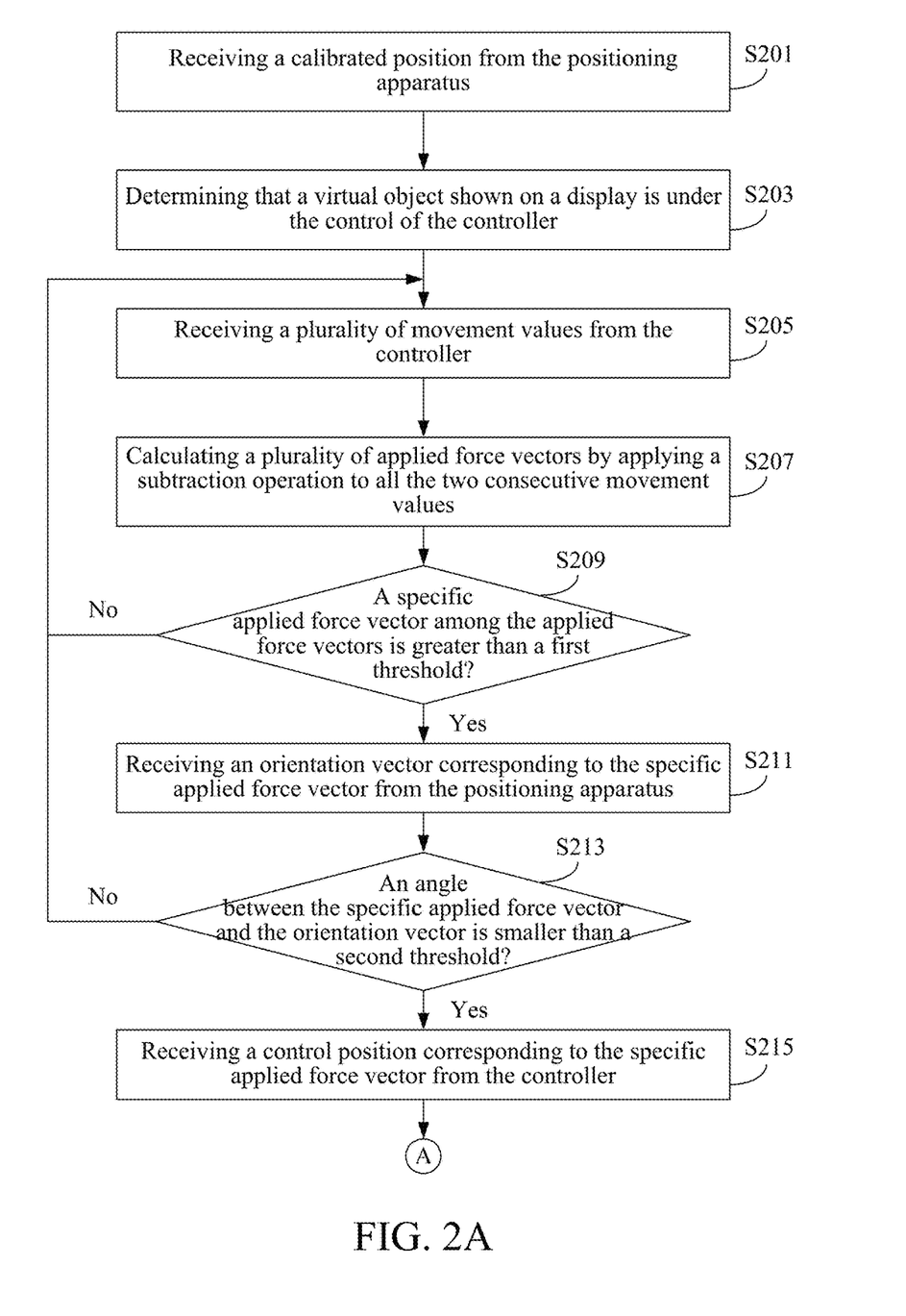
Figure 2B:
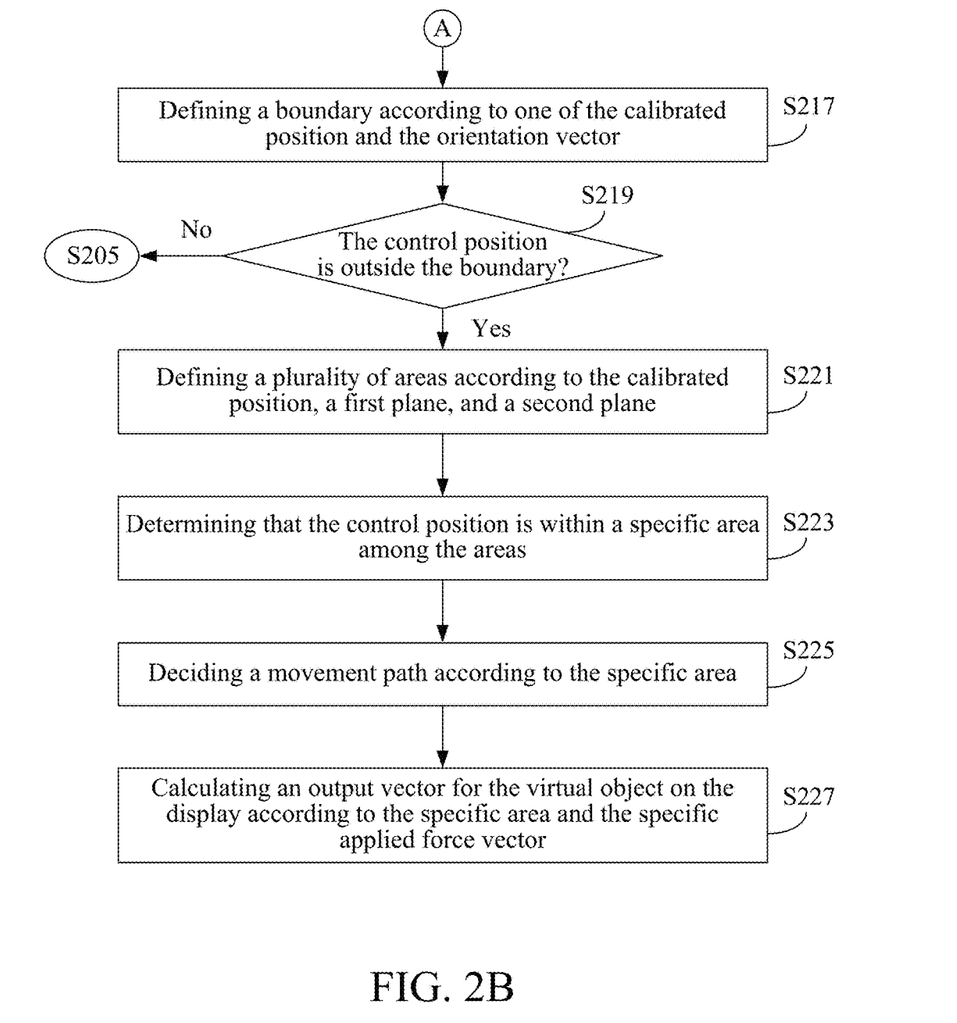
FIG. 2B illustrates the flowchart of the second embodiment.

A second embodiment of the present invention is a user interaction method and a flowchart of the user interaction method is illustrated in FIG. 2A and FIG. 2B. The user interaction method is for use in an electronic computing apparatus (e.g. the user interaction apparatus 11 in the first embodiment), wherein the electronic computing apparatus is electrically connected to a positioning apparatus (e.g. the positioning apparatus 13 in the first embodiment) and a controller (e.g. the controller 15 in the first embodiment).

In the beginning, step S201 is executed by the electronic computing apparatus for receiving a calibrated position from the positioning apparatus. Please note that the step S201 may be omitted if the electronic computing apparatus has had the calibrated position. Next, step S203 is executed for determining that a virtual object shown on a display is under the control of the controller (e.g. the virtual object has been hold by the virtual hand of the user). Next, step S205 is executed by the electronic computing apparatus for receiving a plurality of movement values from the controller, wherein the movement values have a temporal sequence. Afterwards, step S207 is executed by the electronic computing apparatus for calculating a plurality of applied force vectors according to the movement values. For example, the step S207 may calculate the applied force vectors by applying a subtraction operation to all the two consecutive movement values.

Next, step S209 is executed by the electronic computing apparatus for determining whether a specific applied force vector among the applied force vectors is greater than a first threshold. If the result of step S209 is no, the user interaction method returns to step S205 for receiving another plurality of movement values from the controller (if there is any). If the result of step S209 is yes, step S211 is executed by the electronic computing apparatus for receiving an orientation vector corresponding to the specific applied force vector from the positioning apparatus. Please note that the step S211 may be omitted if the electronic computing apparatus has had the orientation vector.

Next, step S213 is executed by the electronic computing apparatus for determining whether an angle between the specific applied force vector and the orientation vector is smaller than a second threshold. If the result of step S213 is no, the user interaction method returns to step S205 for receiving another plurality of movement values from the controller (if there is any). If the result of step S213 is yes, the user interaction method proceeds to step S215. In some embodiments, step S213 is achieved by determining whether a multiplied value of a component of the specific applied force vector and a component of the orientation vector is greater than a third threshold, wherein the component of the specific applied force vector and the component of the orientation vector correspond to the same direction. To be more specific, if the multiplied value of a component of the specific applied force vector and a component of the orientation vector is greater than the third threshold, the angle between the specific applied force vector and the orientation vector is smaller than the second threshold. In step S215, the electronic computing apparatus receives a control position corresponding to the specific applied force vector from the controller.

Following that, step S217 is executed by the electronic computing apparatus for defining a boundary according to one of the calibrated position and the orientation vector. In some embodiments, step S217 may define the boundary according to the calibrated position by defining a first volume centered at the calibrated position and defining a second volume centered at a position within a predetermined distance of the calibrated position, wherein the first volume and the second volume overlap and a surface of the first volume and the second volume forms the boundary. For example, the first volume may be a capsule, the second volume may be a cuboid, and the position is at an opposite direction of a calibrated orientation to the calibrated position. In some other embodiments, step S217 defines the boundary according to the orientation vector by determining that an angle between the orientation vector and a calibrated orientation vector is greater than a fourth threshold and defining a plane perpendicular to the calibrated orientation vector and at a predetermined distance to the calibrated position, wherein the plane is the boundary. It is noted that the user interaction method may execute another step for receiving the aforementioned calibrated orientation vector before the step S203.

Next, step S219 is executed by the electronic computing apparatus for determining whether the control position is outside the boundary. If the result of step S219 is no, the user interaction method returns to step S205 for receiving another plurality of movement values from the controller (if there is any). If the result of step S219 is yes, the electronic computing apparatus controls a movement of the virtual object on the display.

In some embodiments, the electronic computing apparatus executes steps S221, S223, S225, and S227 to control the movement of the virtual object on the display. Specifically, step S221 is executed by the electronic computing apparatus for defining a plurality of areas according to the calibrated position, a first plane, and a second plane, wherein the first plane and the second plane intersect. In some embodiments, the areas include an overhand area, a lower hand area, a side-arm left area, and a side-arm right area.

Following that, step S223 is executed by the electronic computing apparatus for determining that the control position is within a specific area among the areas. Next, step S225 is executed by the electronic computing apparatus for deciding a movement path according to the specific area. In addition, step S225 is executed by the electronic apparatus for calculating an output vector for the virtual object on the display according to the specific area and the specific applied force vector. In some embodiments, the areas defined in step S221 includes an overhand area, a lower hand area, a side-arm left area, and a side-arm right area and the step S223 determines that the specific area is one of the lower hand area, the side-arm left area, and the side-arm right area. For those embodiments, step S225 calculates the output vector by averaging a subset of the applied force vectors, wherein the subset includes the specific applied force vector.

In some embodiments, the areas defined in step S221 includes an overhand area, a lower hand area, a side-arm left area, and a side-arm right area and the step S223 determines that the specific area is the overhand area. For those embodiments, step S225 comprises a step for calculating a first vector by averaging a subset of the applied force vectors, wherein the subset includes the specific applied force vector, another step for calculating a second vector by averaging the specific applied force vector and the applied force vector right before the specific applied force vector, another step for calculating a third vector by averaging the first vector and the second vector, another step for calculating an angle between each of the first vector, the second vector, and the third vector and each of a calibrated orientation vector and an opposite orientation vector of the calibrated orientation vector, and another step for deciding the output vector to be the vector corresponding to the smallest angle.

In some embodiments, the electronic computing apparatus may further execute a step of the user interaction method for applying a weight to the output vector (not shown). Afterwards, the virtual object shown on the display can be moved according to the control position received in step S215, the movement path defined in step S225, and the output vector calculated in step S227.

In addition to the aforesaid steps, the second embodiment can also execute all the operations and steps of the user interaction apparatus 11 set forth in the first embodiment, have the same functions, and deliver the same technical effects as the first embodiment. How the second embodiment executes these operations and steps, have the same functions, and deliver the same technical effects as the first embodiment will be readily appreciated by those of ordinary skill in the art based on the explanation of the first embodiment and, thus, will not be further described herein.

It shall be appreciated that, in the specification of the present invention, the terms "first," "second," "third," "fourth," and "fifth" used in the first applied force vector, the second applied force vector, the third applied force vector, the fourth applied force vector, and the fifth applied force vector are only intended to distinguish these applied force vectors from each other. Additionally, the terms "first," "second," "third," and "fourth" used in the first threshold, the second threshold, the third threshold, and the fourth threshold are only intended to distinguish these thresholds from each other. Likewise, the terms "first," "second," and "third" used in the first predetermined distance, the second predetermined distance, and the third predetermined distance are only intended to distinguish these predetermined distances from each other. Similarly, the terms "first" and "second" used in the first plane and second plane are only intended to distinguish these planes from each other.

The embodiments of the user interaction apparatus and method of the present invention control a virtual object on a display by three parts, including (i) determining whether two applied force conditions are met (i.e. determining whether a specific applied force vector among the applied force vectors is greater than a first threshold and determining whether an angle between the specific applied force vector and an orientation vector is smaller than a second threshold), (ii) determining whether the virtual object is considered as released (i.e. determining whether a control position corresponding to the specific applied force vector is outside the boundary), and (iii) controlling a movement of the virtual object on the display after determining that the virtual object is released. With the three main parts of the operations, the user can control the virtual object on the display like the way in the real world (i.e. without pressing any specifically-designed button). Therefore, these embodiments can provide users with immersive experience that is more similar to the real world.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A user interaction apparatus, comprising:
an interface, being configured to receive a calibrated position from a positioning apparatus; and
a processor, being electrically connected to the interface and configured to determine that a virtual object shown on a display is under a control of a controller, wherein the interface further receives a plurality of movement values from the controller, the processor further calculates a plurality of applied force vectors according to the movement values, and the processor further determines that a specific applied force vector among the applied force vectors is greater than a first threshold,
wherein the interface further receives an orientation vector corresponding to the specific applied force vector from the positioning apparatus and determines that an angle between the specific applied force vector and the orientation vector is smaller than a second threshold,
wherein the interface further receives a control position corresponding to the specific applied force vector from the controller and the processor further defines a boundary according to one of the calibrated position of a positioning apparatus and the orientation vector, determines that the control position is outside the boundary, and controls a movement of a virtual object on a display after determining that the control position is outside the boundary, defines a plurality of areas according to the calibrated position, a first plane, and a second plane, wherein the first plane and the second plane intersect, wherein the processor further determines that the control position is within a specific area among the areas, decides a movement path according to the specific area, and calculates an output vector for the virtual object on the display according to the specific area and the specific applied force vector.

2. The user interaction apparatus of claim 1, wherein the processor determines that the angle between the specific applied force vector and the orientation vector is smaller than the second threshold by determining that a multiplied value of a component of the specific applied force vector and a component of the orientation vector is greater than a third threshold, wherein the component of the specific applied force vector and the component of the orientation vector correspond to the same orientation.

3. The user interaction apparatus of claim 1, wherein the processor defines the boundary according to the calibrated position by defining a first volume centered at the calibrated position and defining a second volume centered at a position within a predetermined distance of the calibrated position, wherein the first volume and the second volume overlap and a surface of the first volume and the second volume forms the boundary.

4. The user interaction apparatus of claim 3, wherein the first volume is a capsule, the second volume is a cuboid, and the position is at an opposite orientation of a calibrated orientation to the calibrated position.

5. The user interaction apparatus of claim 1, wherein the processor defines the boundary according to the orientation vector by determining that an angle between the orientation vector and a calibrated orientation vector is greater than a third threshold and defining a third plane perpendicular to the calibrated orientation vector and at a predetermined distance to the calibrated position, wherein the third plane is the boundary.

6. The user interaction apparatus of claim 1, wherein the areas include an overhand area, a lower hand area, a side-arm left area, and a side-arm right area, the specific area is one of the lower hand area, the side-arm left area, and the side-arm right area, the processor calculates the output vector by averaging a subset of the applied force vectors, and the subset includes the specific applied force vector.

7. The user interaction apparatus of claim 1, wherein the areas include an overhand area, a lower hand area, a side-arm left area, and a side-arm right area, the specific area is the overhand area, the processor further calculates a first vector by averaging a subset of the applied force vectors, the subset includes the specific applied force vector, the processor further calculates a second vector by averaging the specific applied force vector and the applied force vector right before the specific applied force vector, the processor further calculates a third vector by averaging the first vector and the second vector, the processor further calculates an angle between each of the first vector, the second vector, and the third vector and each of a calibrated orientation vector and an opposite orientation vector of the calibrated orientation vector, and the processor decides the output vector to be the vector corresponding to the smallest angle.

8. The user interaction apparatus of claim 1, wherein the processor further applies a weight to the output vector.

9. A user interaction method for use in an electronic computing apparatus, the electronic computing apparatus being electrically connected to a positioning apparatus and a controller, the user interaction method comprising the following steps of:
receiving a calibrated position from the positioning apparatus;
determining that a virtual object shown on a display is under the control of the controller;
receiving a plurality of movement values from the controller;
calculating a plurality of applied force vectors according to the movement values;
determining that a specific applied force vector among the applied force vectors is greater than a first threshold;
receiving an orientation vector corresponding to the specific applied force vector from the positioning apparatus;
determining that an angle between the specific applied force vector and the orientation vector is smaller than a second threshold;
receiving a control position corresponding to the specific applied force vector from the controller;
defining a boundary according to one of the calibrated position of the positioning apparatus and the orientation vector;
determining that the control position is outside the boundary;
defining a plurality of areas according to the calibrated position, a first plane, and a second plane, wherein the first plane and the second plane intersect determining that the control position is within a specific area among the areas;
deciding a movement path according to the specific area; and
calculating an output vector for the virtual object on the display according to the specific area and the specific applied force vector.

10. The user interaction method of claim 9, wherein the step of determining that the angle between the specific applied force vector and the orientation vector is smaller than the second threshold is achieved by:
determining that a multiplied value of a component of the specific applied force vector and a component of the orientation vector is greater than a third threshold, wherein the component of the specific applied force vector and the component of the orientation vector correspond to the same orientation.

11. The user interaction method of claim 9, wherein the step of defining the boundary according to one of the calibrated position of the positioning apparatus and the orientation vector is achieved by: defining a first volume centered at the calibrated position and defining a second volume centered at a position within a predetermined distance of the calibrated position, wherein the first volume and the second volume overlap and a surface of the first volume and the second volume forms the boundary.

12. The user interaction method of claim 11, wherein the first volume is a capsule, the second volume is a cuboid, and the position is at an opposite orientation of a calibrated orientation to the calibrated position.

13. The user interaction method of claim 9, wherein the step of defining the boundary according to one of the calibrated position of the positioning apparatus and the orientation vector is achieved by: determining that an angle between the orientation vector and a calibrated orientation vector is greater than a third threshold and defining a third plane perpendicular to the calibrated orientation vector and at a predetermined distance to the calibrated position, wherein the third plane is the boundary.

14. The user interaction method of claim 9, wherein the areas includes an overhand area, a lower hand area, a side-arm left area, and a side-arm right area, the specific area is one of the lower hand area, the side-arm left area, and the side-arm right area, the step of calculating the output vector for the virtual object on the display according to the specific area and the specific applied force vector is achieved by: (k) calculates the output vector by averaging a subset of the applied force vectors, and the subset includes the specific applied force vector.

15. The user interaction method of claim 9, wherein the areas includes an overhand area, a lower hand area, a side-arm left area, and a side-arm right area, the specific area is the overhand area, and the step of calculating the output vector for the virtual object on the display according to the specific area and the specific applied force vector comprises the following steps of:
   calculating a first vector by averaging a subset of the applied force vectors, wherein the subset includes the specific applied force vector;
   calculating a second vector by averaging the specific applied force vector and the applied force vector right before the specific applied force vector;
   calculating a third vector by averaging the first vector and the second vector; and
   calculating an angle between each of the first vector, the second vector, and the third vector and each of a calibrated orientation vector and an opposite orientation vector of the calibrated orientation vector; and
   deciding the output vector to be the vector corresponding to the smallest angle.

16. The user interaction method of claim 9, further comprising a step for applying a weight to the output vector.

* * * * *

UNITED STATES PATENT AND TRADEMARK OFFICE
CERTIFICATE OF CORRECTION

| | |
|---|---|
| PATENT NO. | : 10,429,949 B2 |
| APPLICATION NO. | : 15/640418 |
| DATED | : October 1, 2019 |
| INVENTOR(S) | : Tzu-Yen Peng and Ssu-Po Chin |

Page 1 of 1

It is certified that error appears in the above-identified patent and that said Letters Patent is hereby corrected as shown below:

In the Claims

Column 14, Line 24, In Claim 9, a ";" is added after the word "intersect"

Column 15, Lines 3-4, In Claim 14, the following words are deleted: "(k) calculates the output vector by"

Signed and Sealed this
Third Day of December, 2019

Andrei Iancu
*Director of the United States Patent and Trademark Office*